(12) United States Patent
Enta

(10) Patent No.: US 10,944,909 B2
(45) Date of Patent: Mar. 9, 2021

(54) ACTUATOR, CAMERA MODULE, AND CAMERA-MOUNTED DEVICE

(71) Applicant: Yohei Enta, Tokyo (JP)

(72) Inventor: Yohei Enta, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 229 days.

(21) Appl. No.: 16/321,478

(22) PCT Filed: Jul. 27, 2017

(86) PCT No.: PCT/JP2017/027261
§ 371 (c)(1),
(2) Date: Jan. 29, 2019

(87) PCT Pub. No.: WO2018/021479
PCT Pub. Date: Feb. 1, 2018

(65) Prior Publication Data
US 2021/0006720 A1  Jan. 7, 2021

(30) Foreign Application Priority Data
Jul. 29, 2016 (JP) .............................. JP2016-150294

(51) Int. Cl.
*H04N 5/232* (2006.01)
*G03B 5/06* (2006.01)
(Continued)

(52) U.S. Cl.
CPC .......... *H04N 5/23287* (2013.01); *G03B 5/06* (2013.01); *G03B 13/36* (2013.01); *H04N 5/2253* (2013.01);
(Continued)

(58) Field of Classification Search
CPC ............. H04N 5/23287; H04N 5/2253; H04N 5/2258; H04N 5/23258; H04N 5/232;
(Continued)

(56) References Cited

U.S. PATENT DOCUMENTS 7,961,234 B2 * 6/2011 Viinikanoja ......... H04N 13/239
348/264
8,660,420 B2 * 2/2014 Chang .................... G03B 35/08
396/326
(Continued)

FOREIGN PATENT DOCUMENTS

| JP | 2007033624 A | 2/2007 |
| JP | 2012-142837 A | 7/2012 |

(Continued)

OTHER PUBLICATIONS

International Search Report from International Application No. PCT/JP2017/027261 dated Oct. 31, 2017.
(Continued)

*Primary Examiner* — Pritham D Prabhakher
(74) *Attorney, Agent, or Firm* — Brundidge & Stanger, P.C.

(57) ABSTRACT

An actuator is provided with: the fixed part being formed by arranging either a coil part or a magnet part on a base member on the external peripheral side of the driven part; a movable part having a frame-like holding member for arranging and holding the other of the coil part or the magnet part on the base-member-side surface on the external peripheral side of the driven part; and a support part for inclinably supporting the movable part in relation to the fixed part, the support part being disposed on the base member. The holding member has, on the surface on the opposite side from the base member and farther inward than the arrangement area of either the coil part or the magnet part, a
(Continued)

mounting surface part on which a first capturing module and a second capturing module are mounted as driven parts.

12 Claims, 10 Drawing Sheets

(51) Int. Cl.
*G03B 13/36* (2006.01)
*H04N 5/225* (2006.01)
(52) U.S. Cl.
CPC ....... *H04N 5/2258* (2013.01); *H04N 5/23258* (2013.01); *G03B 2205/0023* (2013.01); *G03B 2205/0069* (2013.01)
(58) Field of Classification Search
CPC ............. H04N 5/23248; H04N 5/2254; H04N 5/23254; H04N 5/332; H04N 5/2252; H04N 5/23261; H04N 5/225; G03B 5/06; G03B 5/00; G03B 13/36; G03B 2205/0023; G03B 2205/0069; G03B 2205/0076; G03B 2205/0061; G03B 2205/0007; G02B 27/646
USPC ....................................................... 348/208.2
See application file for complete search history.

(56) References Cited

U.S. PATENT DOCUMENTS

| | | | | |
|---|---|---|---|---|
| 8,731,390 | B2 * | 5/2014 | Goldenberg | G03B 3/10 396/133 |
| 9,681,052 | B1 * | 6/2017 | Lewkow | H04N 5/23287 |
| 9,774,787 | B2 * | 9/2017 | Miller | H04N 5/2258 |
| 9,781,345 | B1 * | 10/2017 | Miller | H04N 5/2253 |
| 9,843,706 | B2 * | 12/2017 | Chern | G02B 3/0075 |
| 9,977,226 | B2 * | 5/2018 | Davies | G02B 7/02 |
| 2009/0052037 | A1 | 2/2009 | Wernersson | |
| 2009/0160951 | A1 | 6/2009 | Anderson et al. | |
| 2010/0231779 | A1 * | 9/2010 | Lin | G03B 35/08 348/335 |
| 2011/0128393 | A1 * | 6/2011 | Tavi | H04N 5/2257 348/218.1 |
| 2013/0141541 | A1 * | 6/2013 | Jung | H04N 5/225 348/46 |
| 2013/0148950 | A1 * | 6/2013 | Chang | G03B 35/08 396/326 |
| 2015/0070781 | A1 * | 3/2015 | Cheng | G02B 7/102 359/696 |
| 2015/0201128 | A1 * | 7/2015 | Dong | G02B 27/646 348/208.11 |
| 2015/0316744 | A1 * | 11/2015 | Chen | H02K 41/0356 359/824 |
| 2016/0044250 | A1 * | 2/2016 | Shabtay | H04N 5/23212 348/240.3 |
| 2017/0094180 | A1 * | 3/2017 | Miller | H04N 5/2258 |
| 2017/0094183 | A1 * | 3/2017 | Miller | H04N 5/2258 |
| 2017/0353662 | A1 | 12/2017 | Enta | |

FOREIGN PATENT DOCUMENTS

| | | |
|---|---|---|
| JP | 2014-010287 A | 1/2014 |
| JP | 2016-004253 A | 1/2016 |
| JP | 2016-122055 A | 7/2016 |
| WO | 2016/051871 A1 | 4/2016 |

OTHER PUBLICATIONS

Extended European Search Report for Application No. 17834481.8 dated Jan. 21, 2020, 67 pages.

* cited by examiner

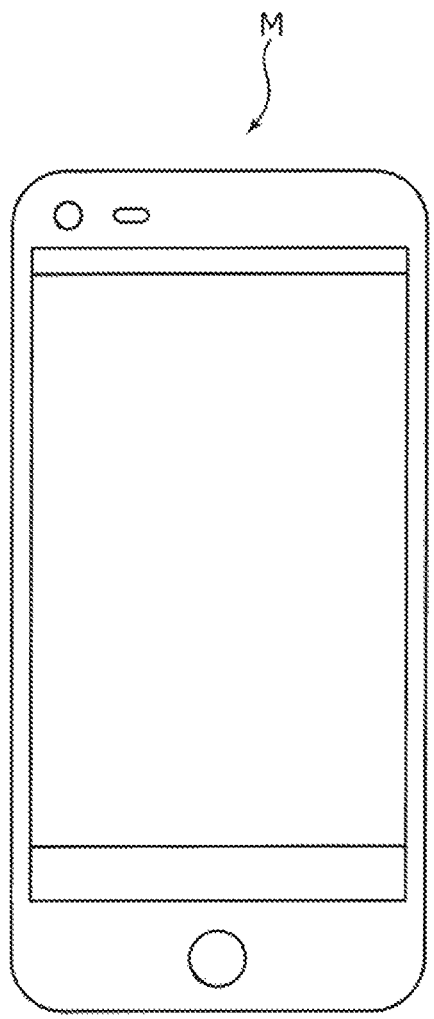
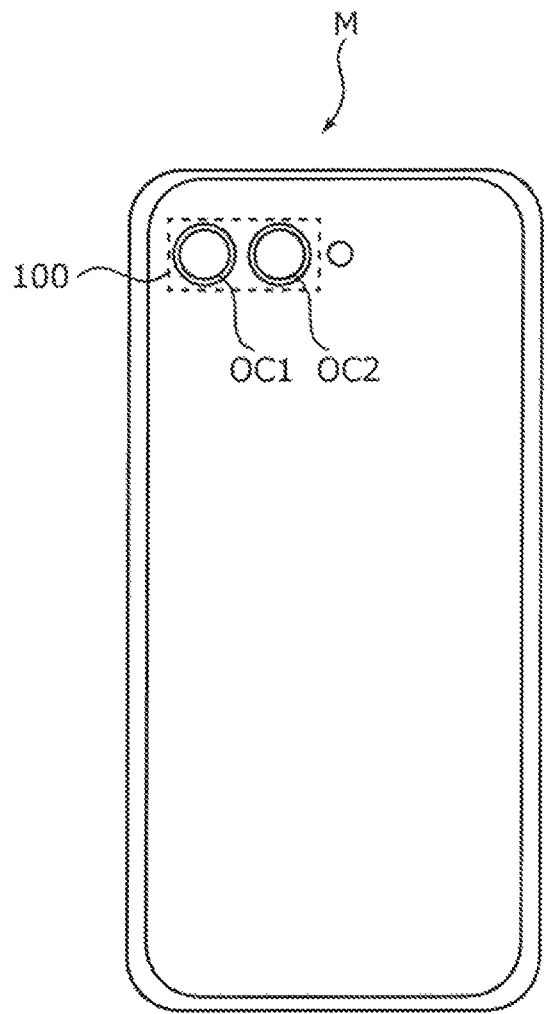
FIG. 3A
FIG. 3B

ACTUATOR, CAMERA MODULE, AND CAMERA-MOUNTED DEVICE

TECHNICAL FIELD

The present invention relates to a camera-shake correction actuator, a camera module having a camera-shake correcting function, and a camera-mounted device.

BACKGROUND ART

In general, a small-sized camera module is mounted in a mobile terminal such as a smartphone. Such a module often has an autofocus function for automatically focusing on a subject at the time of image capturing, and a camera-shake correcting function (optical image stabilization (OIS)) for reducing irregularities of an image by correcting camera shake (vibration) that occurs at the time of image capturing.

As a lens driving device having the autofocus function, for example, a lens driving device illustrated in PTL 1 is known.

The autofocusing lens driving device is provided with: an autofocusing coil disposed, for example, around a lens part; an autofocusing magnet disposed as radially separated from the AF coil; and an elastic support member (for example, a flat spring) that elastically supports an autofocus movable part including a lens part and the AF coil, on an autofocus fixing part including the AF magnet, for example. Hereinafter, the autofocusing coil is referred to as an "AF coil", the autofocusing magnet is referred to as an "AF magnet", the autofocus fixing part" is referred to as an "AF-fixing part", and the autofocus movable part" is referred to as an "AF-movable part." Automatic focusing is possible by moving the AF movable part in an optical-axis direction with respect to the AF fixing part by using a driving force of a voice coil motor made up of the AF coil and the AF magnet. Note that there are cases where the AF-fixing part includes the AF coil, and the AF-movable part includes the AF magnet.

Further, as the camera-shake correction method, a module tilt method of integrally tilting a capturing module is known (for example, PTL 2). The capturing module is a module having a lens part and a capturing device (for example, a charge coupled device (CCD)), and includes a module having an autofocusing actuator.

Hereinafter, the autofocusing actuator is referred to as an "AF actuator," and the camera-shake correcting actuator is referred to as "OIS actuator."

FIG. 1 is an external view illustrating an example of a camera module of a conventional module tilt type. FIG. 2 is an exploded perspective view illustrating the example of the camera module of the conventional module tilt type. As illustrated in FIGS. 1 and 2, camera module 2 of the conventional module tilt type is provided with fixing body 21, movable body 22, elastic support part 23, capturing module 24, and shake detection part 25. Fixing body 21, movable body 22, and elastic support part 23 constitute an OIS actuator.

Fixing body 21 has base member 211, coil part 212, and OIS print wiring board 213. Coil part 212 is disposed on base member 211. OIS print wiring board 213 feeds power to coil part 212, and outputs a detection signal of shake detection part 25 to a control part.

Movable body 22 has yoke 221, magnet part 222, top plate 223, and module guide 224. Yoke 221 and magnet part 222 are disposed in respective housing parts formed in top plate 223. Module guide 224 is fixed to top plate 223. Capturing module 24 is disposed and fixed in a space sandwiched between a pair of module guides 224.

Elastic support part 23 has a biaxial gimbal mechanism, and movable body 22 (top plate 223) is fixed to an outer gimbal. Elastic support part 23 is disposed in a floating state at an approximate center of base member 211 and fixed by stopper 231. Elastic support part 23 supports movable body 22 in a swinging rotatable manner about an X-axis and a Y-axis orthogonal to an optical axis (Z-axis), that is, elastic support part 23 supports movable body 22 in a tiltable manner.

Shake detection part 25 is made up of a gyro sensor that detects an angular velocity of capturing module 24, for example. Shake detection part 25 is fixed to the side surface of module guide 224 of movable body 22. The detection signal of shake detection part 25 is output to the control part through OIS print wiring board 213 that is fixing body 21.

An OIS voice coil motor (VCM) is made up of coil part 212 and magnet part 222. That is, when a current flows through coil part 212, a Lorentz force is generated at coil part 212 due to interaction between the magnetic field of magnet part 222 and a current flowing through coil part 212 (Fleming's left hand rule). Since coil part 212 is fixed, a reactive force acts on magnet part 222. This reactive force is the driving force of the OIS voice coil motor. Movable body 22 swings and rotates until the driving force of the OIS voice coil motor and a restoration force (returning force) of elastic support part 23 become equivalent to each other. As a result, displacement of the optical axis due to camera shake is corrected, and the optical-axis direction is kept constant.

CITATION LIST

Patent Literature

PTL 1
Japanese Patent Application Laid-Open No. 2016-004253
PTL 2
Japanese Patent Application Laid-Open No. 2014-10287

SUMMARY OF INVENTION

Technical Problem

In recent years, a camera module having a plurality of (typically, two) lens driving devices, a so-called dual camera, is being put to practical use. The dual camera has various possibilities according to its use, such as being able to simultaneously capture two images with different focal distances, and being able to simultaneously capture a still image and a moving image.

When the dual camera is formed using a plurality of camera modules of the module tilt type as in PTL 1, for each camera module having a plurality of AF functions, a driving device having an OIS actuator corresponding to each camera module is required.

Therefore, in the case of applying the dual camera to a mobile terminal such as smartphone by using the conventional lens driving device, the OIS actuators respectively corresponding to the plurality of camera modules inhibit size reduction and make it difficult to ensure the space for mounting the dual camera itself, and this is disadvantageous in productization.

An object of the present invention is to provide an actuator, a camera module, and a camera-mounted device that can be reduced in size and cost and are preferable for use of a dual camera free of camera shake.

Solution to Problem

An actuator according to the present invention is an actuator that tilts a driven part for shake correction by using a driving force of a voice coil motor including a coil part and a magnet part, the actuator including:

a fixing body that includes a base member and is provided with one of the coil part or the magnet part on the base member on an outer peripheral side of the driven part;

a movable body that includes a frame-shaped holding member that is provided with and holds the other of the coil part or the magnet part on a surface on a side of the base member on an outer peripheral side of the driven part; and a support part that is disposed on the base member and tiltably supports the movable body with respect to the fixing body, in which the driven part is a first capturing module and a second capturing module each including a lens part and a capturing device, and the holding member includes a mounting surface part on which the first capturing module and the second capturing module are mounted on a surface on a side opposite from the base member and more inside than a provided location of one of the coil part or the magnet part.

A camera module according to the present invention includes:

the actuator mentioned above;

a first capturing module and a second capturing module bonded to the holding member as the driven part, the first capturing module and the second capturing module each including a lens part and a capturing device; and a shake detection part that detects shake of the capturing module.

A camera-mounted device according to the present invention is an information device or a transporting device, the device including the camera module mentioned above.

Advantageous Effects of Invention

According to the present invention, it is possible to achieve a dual camera that can be reduced in size and cost and has no error of camera-shake correction.

BRIEF DESCRIPTION OF DRAWINGS

FIGS. 3A and 3B illustrate a smartphone mounted with a camera module according to one embodiment of the present invention;

DESCRIPTION OF EMBODIMENT

Hereinafter, an embodiment of the present invention will be described in detail with reference to the accompanying drawings.

FIGS. 3A and 3B illustrate smartphone M (camera-mounted device) mounted with camera module 100, to which a lens driving device as an actuator according to one embodiment of the present invention has been applied. FIG. 3A is a front view of smartphone M and FIG. 3B is a rear view of smartphone M.

The smartphone M has a dual camera made up of two rear cameras OC1, OC2. Camera module 100 is applied as a device provided with both rear cameras OC1, OC2 of the dual camera.

Camera module 100 is provided with an autofocus function concerning each of cameras OC1, OC2, and can optically correct camera shake (vibration) that occurs at the time of image capturing to capture an image without blurring, while automatically focusing on a subject at the time of image capturing. For the camera-shake correcting function of camera module 100, a module tilt method is employed. The module tilt method has an advantage in that no distortion is generated at four corners of the screen.

Figure 1:
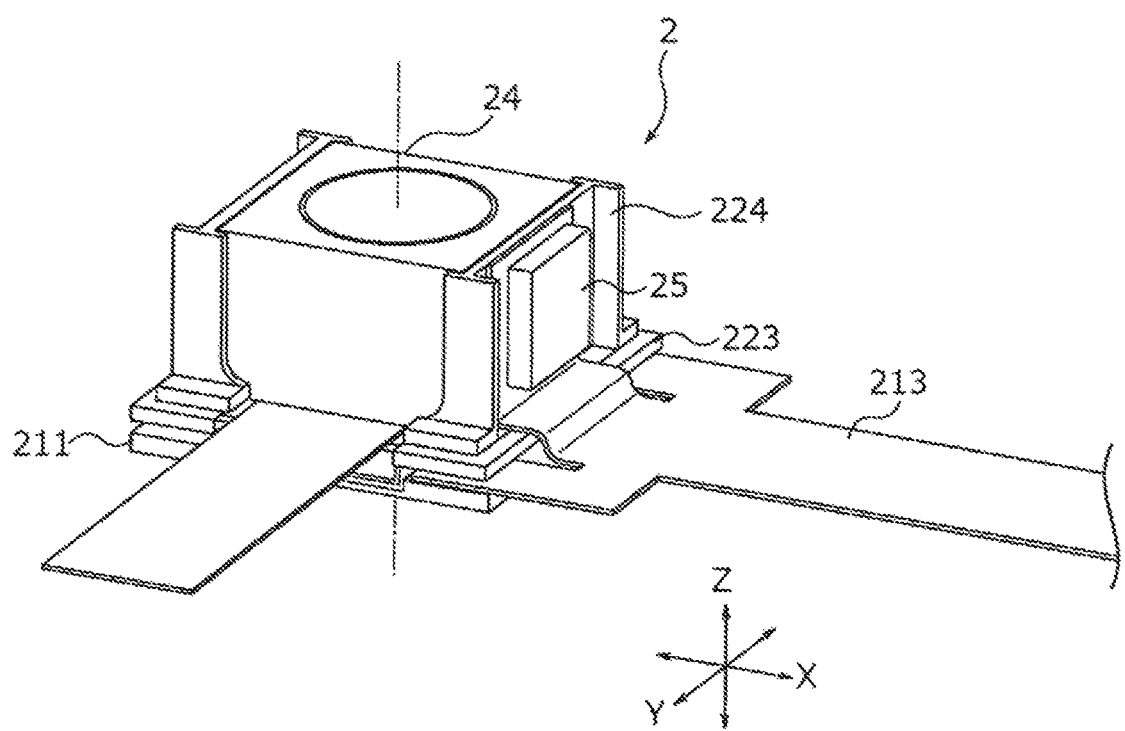
FIG. 1 is an external view illustrating an example of a camera module of a conventional module tilt type.
Figure 2:
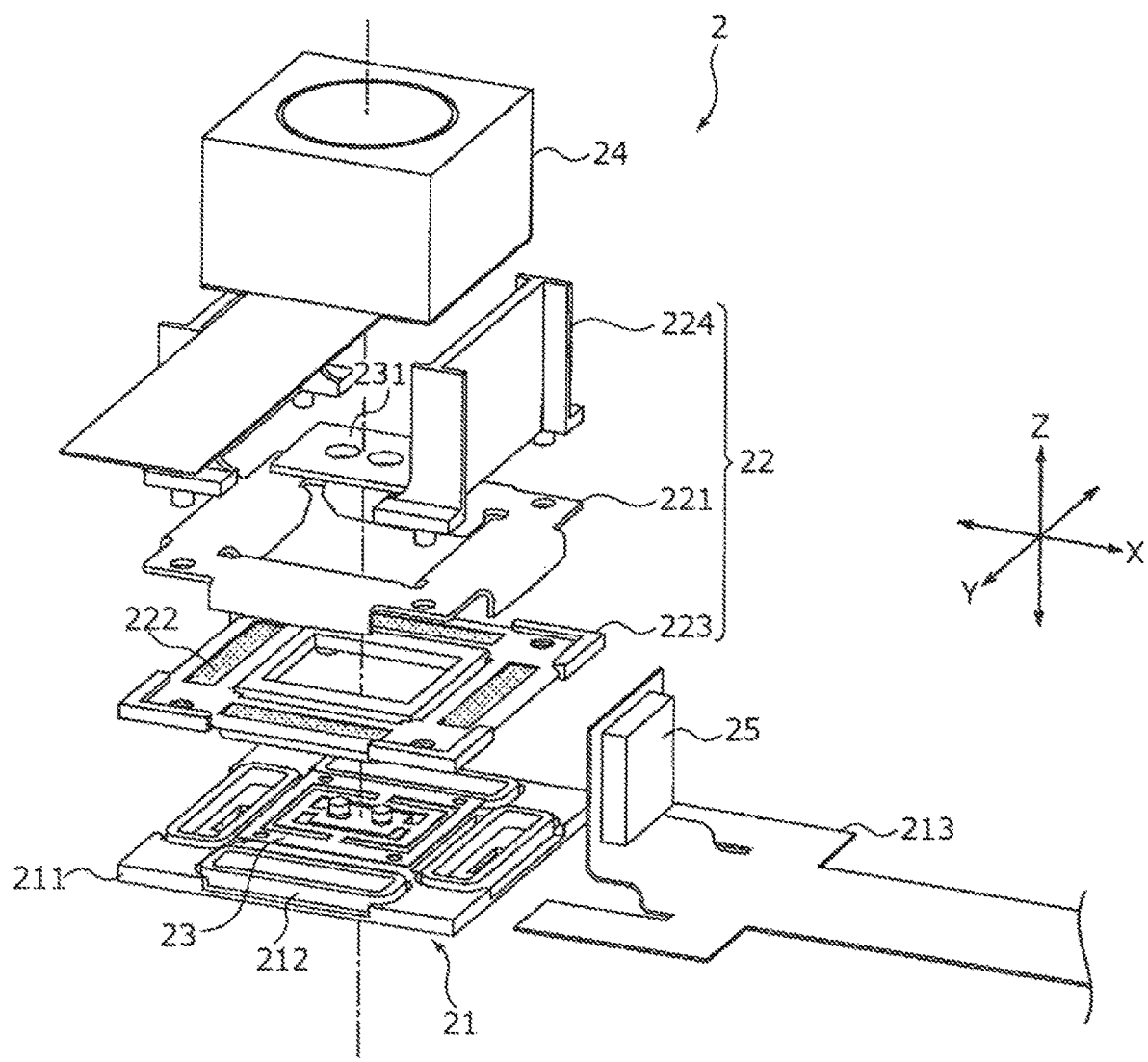
FIG. 2 is an exploded perspective view illustrating the example of the camera module of the conventional module tilt type.
Figure 4:
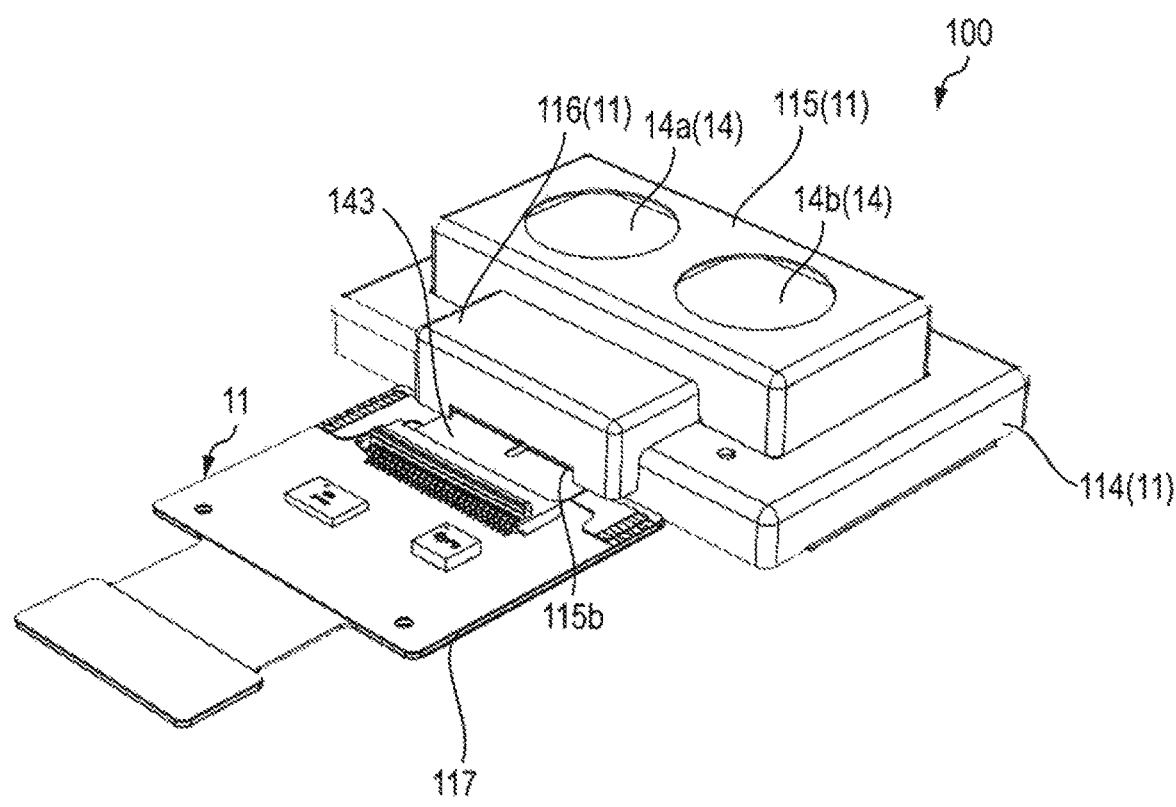
FIG. 4 is an external perspective view of the camera module.
Figure 5:
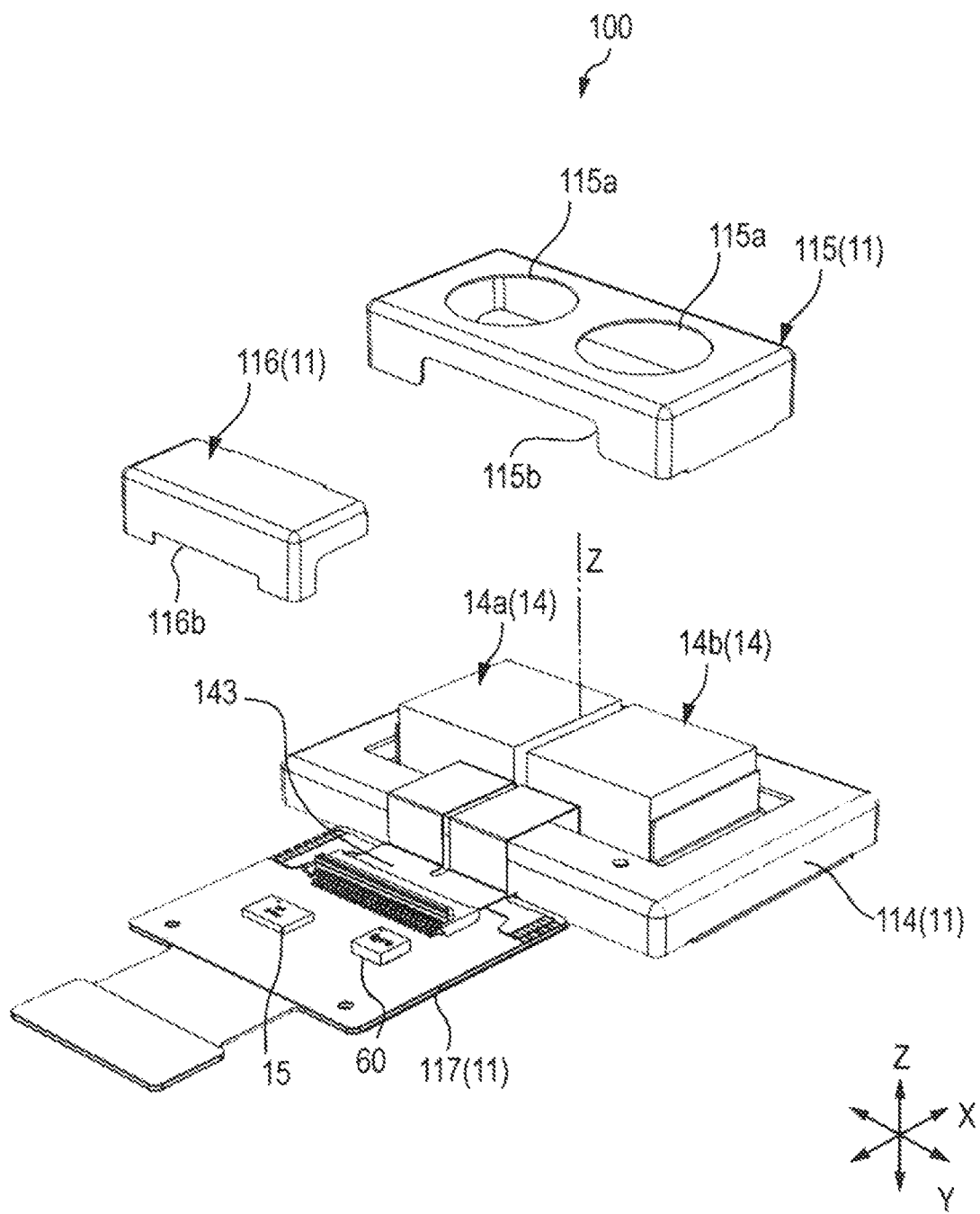
FIG. 5 is an external perspective view illustrating a lens driving device with a cover portion removed therefrom in the camera module.
Figure 6:
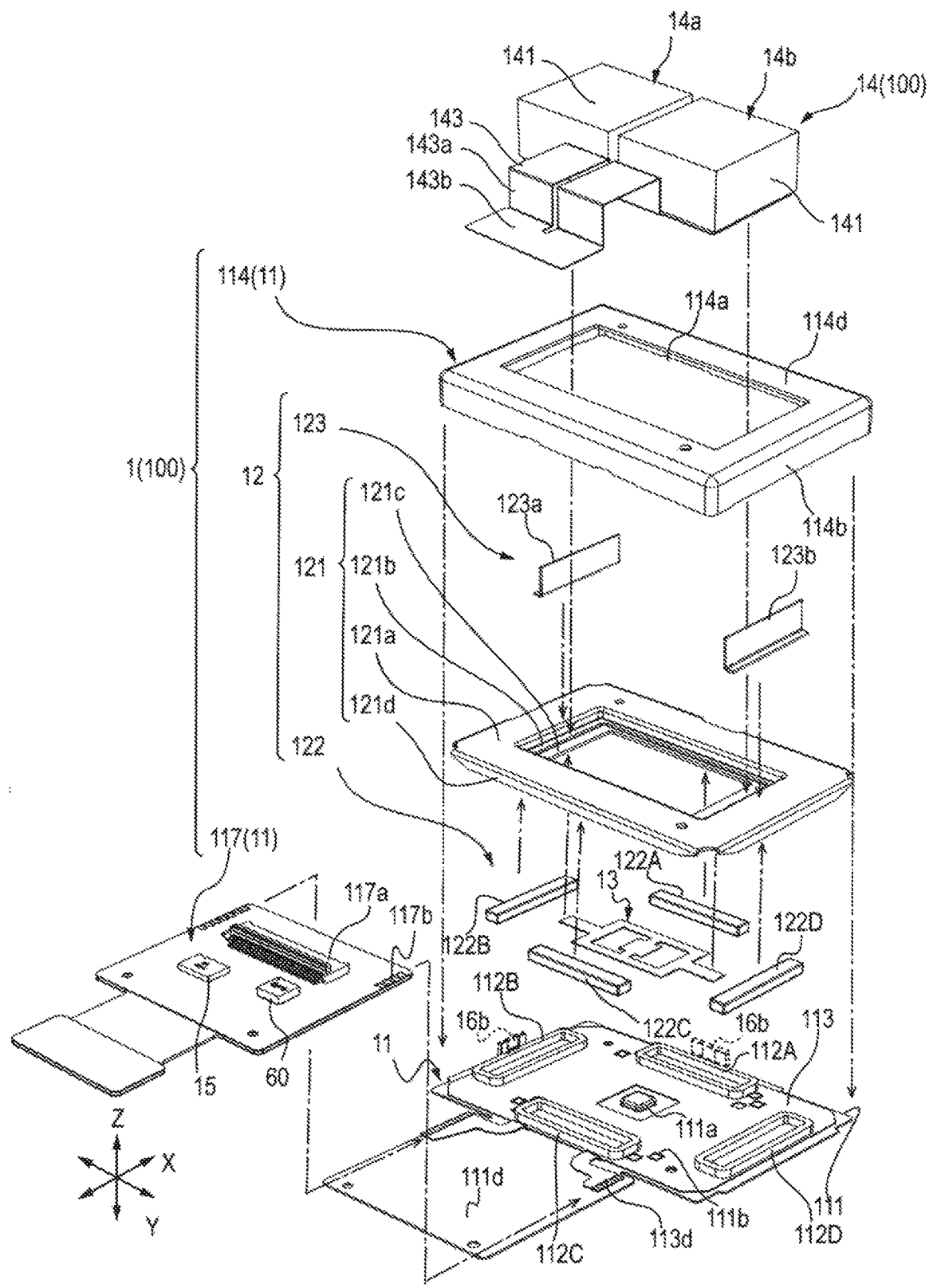
FIG. 6 is an exploded perspective view of the camera module.
Figure 7:
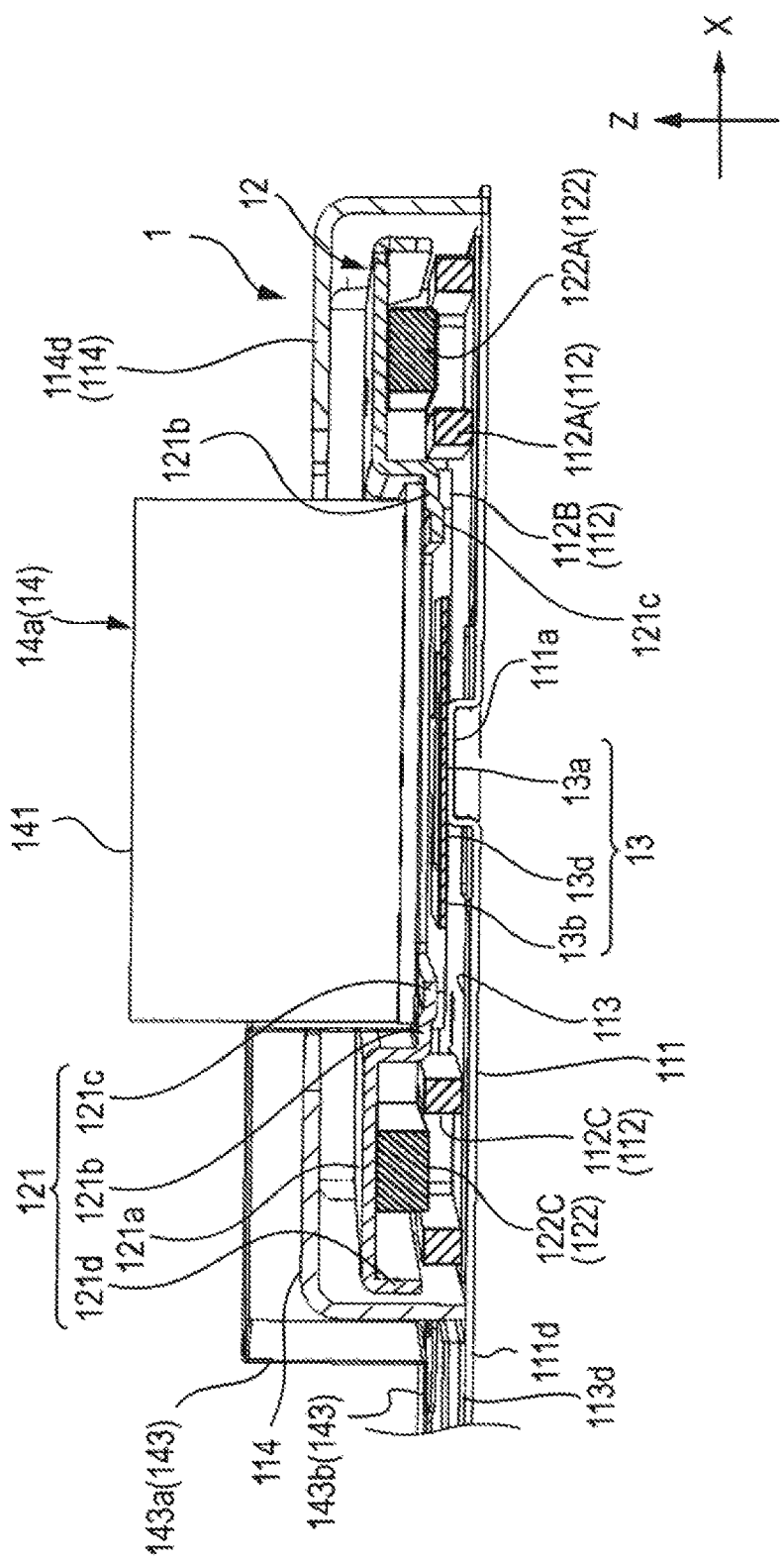
FIG. 7 is a sectional view along a Y-direction of the camera module.
Figure 8:
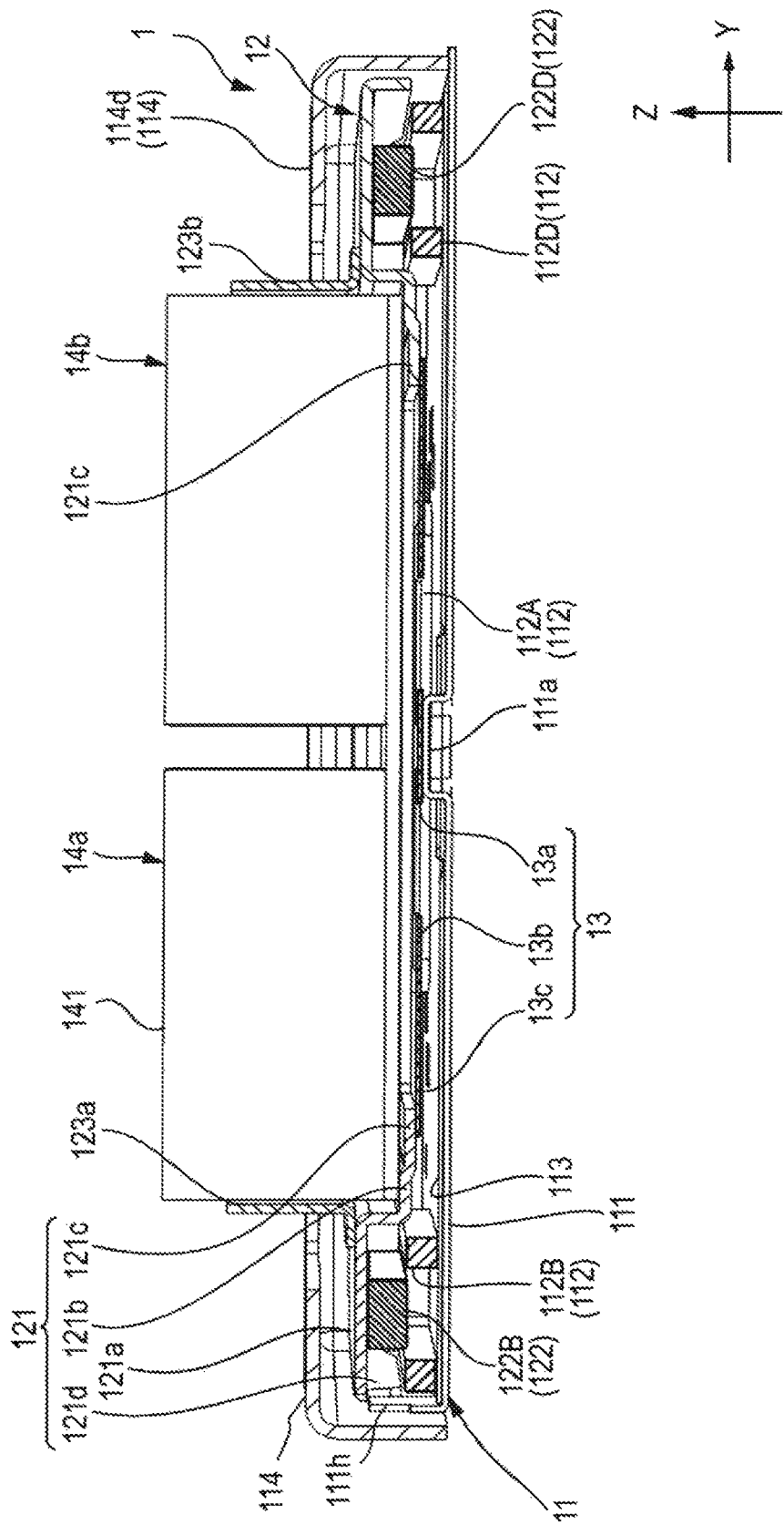
FIG. 8 is a sectional view along an X-direction of the camera module.

FIG. 4 is an external perspective view of camera module 100. FIG. 5 is an external perspective view illustrating lens driving device 1 with a cover portion removed therefrom in camera module 100, and FIG. 6 is an exploded perspective view of camera module 100. FIG. 7 is a sectional view along an X-direction of camera module 100. FIG. 8 is a sectional view along a Y-direction of camera module 100. Note that FIGS. 7 and 8 especially illustrate a magnetic circuit part of a voice coil motor portion.

Here, a description will be given using an orthogonal coordinate system (X, Y, Z) as illustrated in FIGS. 4 and 8. Camera module 100 is mounted such that, when an image is actually captured with smartphone M, the X-direction is a vertical direction (or horizontal direction), the Y-direction is a horizontal direction (or vertical direction), and Z-direction (including an optical-axis direction) is a front-rear direction.

As illustrated in FIGS. 4 to 8, camera module 100 is provided with fixing body 11, movable body 12, elastic support part 13, a plurality of capturing modules 14 (14a, 14b), shake detection part 15, driver IC 60, and the like. Note that camera module 100 may be provided with positional displacement detection part 16b. Fixing body 11, movable body 12, and elastic support part 13 constitute lens driving device 1 having a function as an OIS actuator. In lens driving device 1, camera-shake correction is performed using driving force of an OIS voice coil motor having coil part 112 and magnet part 122. While camera module 100 may be provided with two or more capturing modules as the plurality of capturing modules 14, camera module 100 is assumed here to be a camera module provided with two capturing modules that are first capturing module 14a and second capturing module 14b.

Fixing body 11 is fixed so as not to be movable when installed in smartphone M. Fixing body 11 movably supports movable body 12 via elastic support part 13. Fixing body 11 has base plate 111 constituting the base member together with coil part 112, coil substrate 113, skirt member (cover member) 114, module cover member (hereinafter referred to as "upper cover member", see FIGS. 4 and 5) 115, flexible cover member 116 (see FIGS. 4 and 5), and printed circuit board 117.

Base plate 111 is a substantially rectangular member made of a metal material. By making base plate 111 of metal, base plate 111 has high strength as compared to the case of making the base plate of resin, and can be reduced in thickness, and furthermore, the profile of camera module 100 can be reduced in height.

Base plate 111 has projection 111a in a truncated pyramid shape for fixing elastic support part 13 to a central part of a region over which movable body 12 is disposed. Here, a central portion of projection 111a is preferable disposed so as to pass through the Z-axis. Base plate 111 has, around projection 111a, a pat-like power feeding part 111b for feeding power to coil part 112.

On base plate 111, coil substrate 113 is disposed in a region over which movable body 12 is disposed. Projection 111a projects upward from a center opening of coil substrate 113. Base plate 111 may be provided with a projection side part that protrudes from the peripheral edge of coil substrate 113 and is engaged with a notch of skirt member 114, to which upper cover member 115 is fixed, to perform positioning at the time of fixing upper cover member 115 and skirt member 114. In addition, printed circuit board 117 is disposed on a part of base plate 111.

As illustrated in FIG. 6, on base plate 111 of fixing body 11, a piece part having a recessed (U-shaped) notch may be vertically provided in a central portion of the two orthogonal sides out of four sides constituting the peripheral edge, and hole element 16b as a positional displacement detection part may be provided in the recessed shape. Note that hole element 16b is virtually illustrated in FIG. 6 and omitted in the other drawings.

When positional displacement detection part 16b is provided, positional displacement detection part 16b can sense movement (rotation and swinging) of movable body 12, namely the plurality of capturing modules 14a, 14b, and can detect in a non-contact manner the position of movable body 12, namely the plurality of capturing modules 14a, 14b, in the plane direction (XY-directions) orthogonal to the optical axis. In other words, positional displacement detection part 16b can sense rotation and swinging of movable body 12, namely postures of the plurality of capturing modules 14a, 14b, to detect tilting thereof with respect to the X-axis and the Y-axis. When positional displacement detection part 16b is provided, positional displacement detection part 16b is installed on coil substrate 113 and connected to connection terminal part 113d via a wiring pattern of coil substrate 113.

Coil substrate 113 is a substrate having a circuit connected to each of input and output terminals of an electronic component used in lens driving device 1 for realizing OIS.

Coil substrate 113 is a flexible printed wiring board formed in a rectangular shape with wiring connected to coil part 112 (and positional displacement detection part 16b). Note that the wiring of coil substrate 113 is a wiring pattern including a power source line of coil part 112, and when positional displacement detection part 16b is provided, the wiring also includes a signal line of positional displacement detection part 16b. Here, coil substrate 113 has tilt coils 112A to 112D as coil part 112, two hole elements as positional displacement detection part 16b, and connection terminal part 113d made up of the total of twelve pins, connected to the hole elements. That is, the wiring pattern of coil substrate 113 includes wiring that connects tilt coils 112A to 112D, hole element 16b, and connection terminal part 113d. Connection terminal part 113d is formed in a part extending laterally from a part of the outer periphery of a rectangular portion. For example, the connection terminal part 113d has twelve pin terminals, and the twelve pin terminals consist of the total of four pins, two pins each of the input and output terminals for each of the facing tilt coils 112A to 112D, and the total of eight pins of the hole elements 16b.

Coil substrate 113 is disposed on printed circuit board 117 that is fixed while placed on part 111d of base plate 111, and connection terminal part 113d is connected to connection terminal part 117b on printed circuit board 117.

On coil substrate 113, along with power feeding to coil part 112, a signal of positional displacement detection part 16b can be output and input to a connecting destination via connection terminal part 113d. Here, when positional displacement detection part 16b is provided, its detection signal is output to a circuit of printed circuit board 117 since connection terminal part 113d is connected to connection terminal part 117b of printed circuit board 117. Note that the detection signal of positional displacement detection part 16b is output to the control part (not illustrated) via the circuit of printed circuit board 117.

Coil part 112 constitutes a voice coil motor together with magnet part 122 described later, and tilts first capturing module 14a and second capturing module 14b both at once for shake correction by the driving force of the voice coil motor.

Coil part 112 is provided on the outer peripheral sides of first capturing module 14a and second capturing module 14b. Coil part 112 is made up of four tilt coils 112A to 112D and disposed on coil substrate 113 on base plate 111 so as to surround projection 111a. Coil part 112 (tilt coils 112A to 112D) is provided with a winding shaft of the coil oriented in a direction in which base plate 111 and yoke (holding member) 121 face each other. Power is fed to coil part 112 (tilt coils 112A to 112D) via a power feeding part of coil substrate 113.

Tilt coils 112A, 112C face each other in the X-direction are used in the case of rotating and swinging movable body 12 about Y-axis. Tilt coils 112B, 112D face each other in the Y-direction and is used in the case of rotating and swinging movable body 12 about X-axis.

Skirt member 114 is a member formed by connecting four wall bodies 114b in a rectangular frame shape, and has reception port 114a of capturing modules 14a, 14b on the upper surface. Rectangular regulation part 114d in a rectangular frame shape is provided in the upper part of each wall body 114b of skirt member 114, regulation part 114d slightly protruding inward from each upper part and forming an opening edge of reception port 114a. Regulation part 114d prevents excessive tilting of movable body 12 (specifically, yoke 121 and magnet part 122) disposed in skirt member 114 via the inside of the frame shape, namely reception port 114a of skirt member 114.

Skirt member 114 is fixed by being externally engaged with the outer peripheral edge of base plate 111 after movable body 12 is attached to base plate 111, on which coil substrate 113 is superimposed, via elastic support part 13. Movable body 12 is movably laid across base plate 111 and skirt member 114.

Upper cover member 115 is a member in a covered rectangular cylindrical shape having a plurality of openings 115a on a lid portion on the upper surface. Upper cover member 115 causes the respective lens parts of first capturing module 14*a* and second capturing module 14*b* (illustrated as body 141 of the module) to face the outside via a plurality of openings 115*a*.

After the plurality of capturing modules 14*a*, 14*b* are mounted on lens driving device 1, upper cover member 115 is externally engaged with skirt member 114 and fixed to base plate 111. One side surface of upper cover member 115 is provided with outlet 115*b* for extracting, to the outside, capturing-module printed wiring board 143 drawn from body 141 of capturing modules 14*a*, 14*b*. Outlet 115*b* is covered with flexible cover member 116. Flexible cover member 116 covers a portion over the upper surface of skirt member 114 on capturing-module printed wiring board 143 in a state where a movable region of movable body 12 is ensured.

Movable body 12 swings and rotates (rotates at an angles of Xθ and Yθ) about the X-axis and Y-axis with respect to fixing body 11. Movable body 12 has yoke (holding member) 121, magnet part 122, and a pair of module guides 123*a*, 123*b*. At the time of installing capturing modules 14*a*, 14*b* on lens driving device 1, yoke 121 is held by directly arranging capturing modules 14*a*, 14*b*. Capturing modules 14*a*, 14*b* are, for example, bonded to the upper surface of yoke 121 with, for example, a double-sided tape, a resin-made adhesive bond, or the like. Here, capturing modules 14*a*, 14*b* are fixed by being uniformly disposed on a stepped surface part (mounting surface part) 121*b* constituting the opening edge of the central portion of yoke 121. Yoke 121 is formed in a recessed shape that is opened upward, and the plurality of capturing modules 14*a*, 14*b* as the driven part are disposed in the recessed shape. Therefore, without use of the positioning member like the module guide described in PLT 2, it is possible to highly accurately position and fix capturing modules 14*a*, 14*b* to yoke 121, with the recessed inner wall serving as a guide.

Yoke 121 is a member in a rectangular frame shape formed of a magnetic material, and has rectangular yoke body (holding part body) 121*a*, a stepped surface part 121*b* in a flat frame shape that is provided on the inside of the frame shape of yoke body 121*a* and fixes capturing module 14 placed, and second stepped surface part (gimbal fixing part) 121*c* at the lowest level.

Yoke body 121*a* is formed in a flat frame shape obtained by connecting four flat panels into a rectangular shape, with magnet part 122 fixed to the bottom surface. Yoke 121 has an outer hanging part 121*d* formed so as to project downward and hang along the outer peripheral edge of yoke body 121*a* constituting an upper panel portion of yoke 121 (specifically, the outer edge of each flat panel constituting yoke body 121*a*). Further, in the inner peripheral edge of yoke body 121*a* (specifically, the inner edge of each flat panel constituting yoke body 121*a*), an inner hanging part is formed facing outer hanging part 121*d* in the direction orthogonal to the Z-direction, along the inner peripheral edge.

In yoke 121, the inner hanging part forms a step, and with this inner hanging part, a stepped surface part (mounting surface part) 121*b* is formed downward in a stepped shape on the inner peripheral side of yoke body 121*a*. Further, a second stepped surface part (gimbal fixing part) 121*c* is continuously provided at the inner peripheral edge of stepped surface part 121*b*, second stepped surface part 121*c* constituting the bottom surface of the central part of yoke 121 at a position lower than stepped surface part 121*b*.

As thus described, the cross-sectional shape of one side of yoke 121 is a recessed shape opened to the base plate 111 side, and is a "U" shape opened downward at the center. Yoke body 121*a* being the bottom surface in this recessed shape and a provided location of magnet part 122 is located at a position separated from base plate 111 more than stepped surface part 121*b* and second stepped surface part 121*c*. Specifically, stepped surface part 121*b* is formed in a flat rectangular frame shape and joined, at its outer peripheral edge, to the inside of yoke body 121*a* at a position lower than yoke body 121*a*. Additionally, second stepped surface part 121*c* is formed in a flat rectangular frame shape and joined, at its outer peripheral edge, to the inside of stepped surface part 121*b* at a position lower than stepped surface part 121*b*.

The plurality of capturing modules 14*a*, 14*b* are fixed in a disposed state to the central portion recessed in yoke 121, namely, onto stepped surface part (mounting surface part) 121*b* of the rectangular flat shape inside yoke body 121*a*.

The respective bottom surface of first capturing module 14*a* and second capturing module 14*b* that are the plurality of capturing modules 14 are fixed to the upper surface of stepped surface part 121*b* (a part of the upper surface of yoke 121) with a double-sided tape or a resin-made adhesive bond. In the present embodiment, capturing modules 14*a*, 14*b* are fixed onto the stepped surface part 143*b* of yoke 121, but capturing modules 14*a*, 14*b* may be attached in any manner as long as the bottom surfaces thereof are located at lower positions of the height level than yoke body 121*a*. Capturing modules 14*a*, 14*b* may be configured to be fixed onto second stepped surface part 121*c*.

A pair of module guides 123*a*, 123*b* are vertically provided upward from yoke 121. On the plurality of capturing modules 14*a*, 14*b* fixed onto stepped surface part 121*b* of yoke 121, module guides 123*a*, 123*b* face each other so as to sandwich capturing modules 14*a*, 14*b* from the right and left in the Y-direction. Thereby, module guides 123*a*, 123*b* serve as guides at the time of placing and fixing capturing modules 14*a*, 14*b* onto stepped surface part 121*b* of yoke 121. Then, the pair of module guides 123*a*, 123*b* are also fixed via an adhesive bond or the like to one side surfaces (the side surface separated in the Y-direction) of capturing modules 14*a*, 14*b*, that module guides 123*a*, 123*b* face respectively. Hence capturing modules 14*a*, 14*b* are correctly attached to movable body 12, so that improvement in reliability can be realized. Note that module guides 123*a*, 123*b* are projected upward from reception port 114*a* of skirt member 114 along with first capturing module 14*a* and second capturing module 14*b*.

As thus described, in yoke 121, first capturing module 14*a* and second capturing module 14*b* are fixed in stepped surface part 121*b* located lower than yoke body 121*a*, to which magnet part 122 is fixed. That is, magnet part 122 is located at a position closer to outer peripheral side than stepped surface part 121*b* and higher than stepped surface part 121*b*. That is, yoke body 121*a* is disposed at a position around stepped surface part 121*b* and second stepped surface part 121*c* and separated from base plate 111 in the Z-direction more than stepped surface part 121*b*.

Magnet part 122 is made up of four permanent magnets 122A to 122D in a rectangular parallelepiped shape, respectively corresponding to tilt coils 112A to 112D. An electromagnet may be used instead of the permanent magnet. Each of permanent magnets 122A to 122D has such a size with which permanent magnets 122A to 122D are accommodated inside tilt coils 112A to 112D.

Permanent magnets 122A to 122D are disposed on the lower surface of the respective flat plates of yoke 121 such that a magnetization direction is parallel to the Z-direction, and is fixed by bonding, for example.

Further, permanent magnets 122A to 122D are located between outer hanging part 121d of yoke 121 and the inner hanging part facing outer hanging part 121d. Here, permanent magnets 122A to 122D face to each of the inner hanging part and outer hanging part 121d at a position where a gap is provided from each of the hanging parts in yoke body 121a formed in inverted U shapes between inner hanging part and outer hanging part 121d.

Coil part 112 is located between magnet part 122 and yoke 121 (specifically, yoke body 121a) (see FIGS. 7, 8). Magnet part 122 is located on the winding axis of the winding of coil part 112. Magnet part 122 and coil part 112 are disposed such that in yoke 121 and base plate 111, the central part of coil part 112 is opened along the bonding direction of capturing module 14, and magnet part 122 projects in the central part of coil part 112.

Specifically, tilt coils 112A to 112D are located between outer hanging part 121d and permanent magnets 122A to 122D and between the inner hanging part and permanent magnets 122A to 122D. With the periphery of coil part 112 being covered by yoke 121, it is possible to avoid the AF actuator of body 141 of each of capturing modules 14a, 14b from being adversely affected due to a magnetic field generated by a flowing current of coil part 112.

Further, magnet part 122 and coil part 112, namely the magnetic circuit part having these parts, are located at lower ends of capturing modules 14a, 14b and on the outer peripheral side of stepped surface part 121b (specifically, XY-direction sides). That is, the magnetic circuit part having magnet part 122 and coil part 112 is not disposed immediately under the lower end of capturing module 14 or stepped surface part 121b. In other words, magnet part 122 (permanent magnets 122A to 122D) and coil part 112 (tilt coils 112A to 112D) are disposed on coil substrate 113 that overlaps base plate 111 at the lower ends of capturing modules 14a, 14b disposed in the Y-direction and on the outer peripheral side in the XY-directions of stepped surface part 121b of yoke 121.

Figure 9:
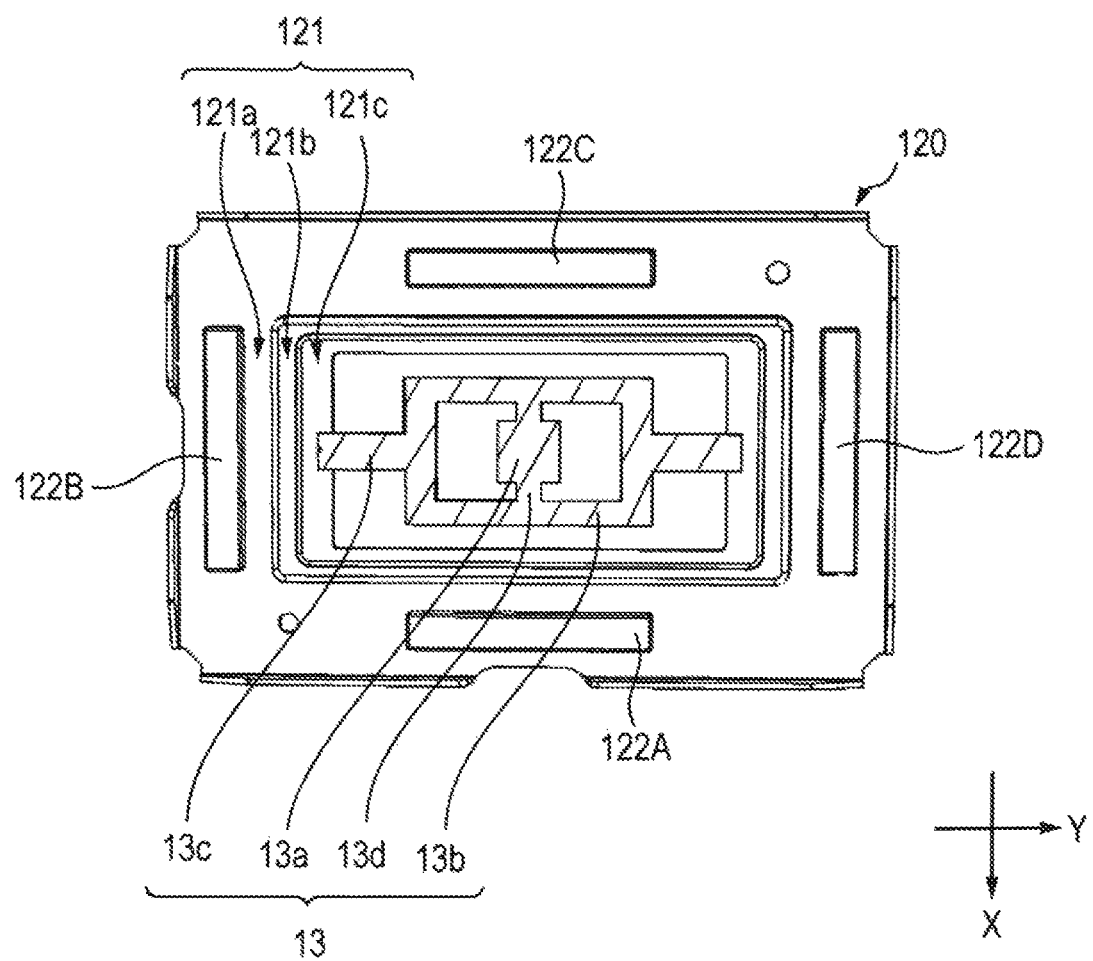
FIG. 9 is a bottom view of the movable part illustrating a yoke, to which an elastic support part has been attached.

Elastic support part 13 is made of a rectangular member (so-called gimbal spring) having a biaxial gimbal mechanism. FIG. 9 is a bottom view of movable body 12 illustrating a yoke 121, to which elastic support part 13 has been attached.

As illustrated in FIG. 9, elastic support part 13 has a central part 13a, frame-shaped gimbal part 13b disposed so as to surround central part 13a at the center, Y-axis connection part 13c, and X-axis connection part 13d. Elastic support part 13 is disposed in the opening inside yoke 121, and here, elastic support part 13 is connected at the opening edge of the lower surface of yoke 121. Specifically, elastic support part 13 is disposed so as to be parallel to the lower surface of second stepped surface part 121c at the lowest position in yoke 121. Central part 13a is disposed at the center of the opening of yoke 121. Central part 13a and gimbal part 13b are connected by X-axis connection part 13d extending in the X-direction, and gimbal part 13b and the lower surface of yoke 121 are connected by Y-axis connection part 13c extending in the Y-direction.

Thereby, yoke 121 and central part 13a can be relatively revolve and swing about Y-axis connection part 13c due to deformation of elastic support part 13 including Y-axis connection part 13c, and can revolve and swing about X-axis connection part 13d due to deformation of elastic support part 13 including X-axis connection part 13d. In FIG. 9, the gimbal being elastic support part 13 is indicated by hatching so as to be differentiated from the other constituent members.

As illustrated in FIG. 9, here, central part 13a is formed in a rectangular frame shape, and central part 13a can swing and rotate with respect to yoke 121 about the X-axis and the Y-axis via frame-shaped gimbal part 13b surrounding central part 13a. Note that elastic support part 13 may be configured such that gimbal part 13b and central part 13a are connected by Y-axis connection part 13c extending in the Y-axis direction, and gimbal part 13b and yoke 121 are connected by X-axis connection part 13d extending in the X-axis direction.

Central part 13a of elastic support part 13 is bonded or welded onto projection 111a of base plate 111. Thus, in elastic support part 13, as illustrated in FIGS. 7 and 8, a portion closer to the outer peripheral side than central part 13a comes into the state of being located at a predetermined interval from the upper surface of base plate 111. This predetermined interval is a movable range of elastic support part 13 during revolution about the central shafts in the X-direction and the Y-direction in which elastic support part 13 is movable. Note that first capturing module 14a and second capturing module 14b that are the plurality of capturing modules are preferably disposed in proximity from the center of central part 13a at an equal interval.

Further, as illustrated in FIG. 9, in elastic support part 13, gimbal part 13b is connected to central part 13a via X-axis connection part 13d, and gimbal part 13b is bonded or welded to a pair of parallel side parts of the lower surface of stepped surface part 121b or second stepped surface part 121c of yoke 121 via Y-axis connection part 13c extending in the Y-axis direction. As a result, movable body 12 is disposed in the state of being raised at the substantially center of base plate 111 (specifically, coil substrate 113), orthogonal to the optical axis, and become able to swing and rotate about two mutually orthogonal directions, namely the X-axis and the Y-axis.

With elastic support part 13 being fixed to base plate 111 by bonding, a fitting member such as the stopper described in PLT 1 is not required.

Further, in the present embodiment, elastic support part 13 is attached, via Y-axis connection part 13c, to the lower surface of second stepped surface part 121c located on the lower side than stepped surface part 121b bonded to the upper surfaces of first capturing module 14a and second capturing module 14b. Therefore, the length of separation between elastic support part 13 and capturing module 14 in the Z-direction almost corresponds to the thickness of second stepped surface part 121c in addition to the thickness of stepped surface part 121b. Therefore, in skirt member 114, it is possible to ensure the rotation swinging region of yoke 121, and to reduce the length of camera module 100 itself in the Z-direction, namely to lower the profile of camera module 100.

Capturing module 14 is first capturing module 14a and second capturing module 14b. Each of first capturing module 14a and second capturing module 14b has body 141 including the lens part, the capturing device, and the AF actuator, and capturing-module printed wiring board 143 connected to body 141.

The capturing device (not illustrated) is made up of, for example, a charge coupled device (CCD) image sensor, a complementary metal oxide semiconductor (CMOS) image sensor, and the like. The capturing device (not illustrated) is installed on capturing-module printed wiring board 143. The capturing device (not illustrated) captures a subject image, formed by the lens part. The AF actuator has, for example, an AF voice coil motor, and moves the lens part in the optical-axis direction by using the driving force of the AF voice coil motor. A known technique is applied to the AF actuator.

Capturing-module printed wiring board 143 is made up of flexible printed circuits having flexibility. Capturing-module printed wiring board 143 has a power source line (not illustrated) for feeding power to the coil part (not illustrated) of AF actuator 2, a signal line (not illustrated) for a video signal output from the capturing device, and a signal line (not illustrated) for a detection signal output from shake detection part 15. When capturing-module printed wiring board 143 along with capturing module 14 is mounted on lens driving device 1, as illustrated in FIGS. 4, 5, and 6, a drawing part 143a of capturing-module printed wiring board 143 gets over skirt member 114 from the inside of skirt member 114 and is pulled out to the outside via outlet 115b of upper cover member 115. Specifically, drawing part 143a of capturing-module printed wiring board 143 extends upward from the lower surfaces of capturing modules 14a, 14b, is bent above skirt member 114 with a predetermined interval therefrom so as to extend toward the outside of the skirt part, and is extended from outlet 115b of upper cover member 115 to the outside. Capturing-module printed wiring board 143 having pulled out is connected to connector 117a of printed circuit board 117 of fixing body 11 in end-side portion 143b. As thus described, capturing-module printed wiring board 143 is configured to be provided in movable body 12, but since having flexibility, the capturing-module printed wiring board 143 does not hinder the movability of movable body 12. Note that capturing-module printed wiring board 143 may be branched in the middle, and different connectors may be mounted on a signal line for the video signal and a signal line for the detection signal.

Shake detection part 15 detects shake (movement) of electronic equipment such as a smartphone mounted with camera module 100. Shake detection part 15 is made up of a gyro sensor that detects an angular velocity of camera module 100 (electronic equipment such as a smartphone mounted with camera module 100). Shake detection part 15 detects shake in at least two orthogonal axes (X, Y) with respect to at least optical axis O (parallel to the Z-axis). Here, shake in each of three axial directions, the X, Y, and Z-directions, can be detected.

In the present embodiment, shake detection part 15 detects shake (movement) of the electronic equipment such as a smartphone mounted with camera module 100 to detect shake angles of movable body 12, first capturing module 14a, and second capturing module 14b. Based on the detected shake angles, the flowing current of coil part 112 is controlled via driver IC 60 and movable body 12 is made movable to correct shake.

The detection signal of shake detection part 15 is output to the control part (not illustrated) via the circuit of printed circuit board 117.

When positional displacement detection part 16 is provided, the control part (not illustrated) may control the flowing current of coil part 112 via driver IC 60 based on the above detection signal and a detection signal of positional displacement detection part 16 (for example, a hole element that detects positional displacement in each of the X-axis and the Y-axis). Note that the function of the control part (not illustrated) may be carried out by driver IC 60. Further, a control part installed in smartphone M may be used via printed circuit board 117. By detecting the tilting of camera module 100 itself by shake detection part 15, a shake angle is detected, and when positional displacement detection part 16b is provided, a detection signal (hole output value) corresponding to the detected angle is detected by positional displacement detection part 16b, and based on the detected value, the flowing current of coil part 112 is controlled via driver IC 60 and movable body 12 is made movable to correct shake.

Driver IC 60 functions as the driving part that feeds power to coil part 112 to make movable body 12 movable by control of the control part (not illustrated), namely, drives first capturing module 14a and second capturing module 14b that are attached to movable body 12. In the present embodiment, shake detection part (gyro sensor) 15 is not provided on the side surface of first capturing module 14a or second capturing module 14b, but installed on printed circuit board 117 of camera module 100. Shake detection part (gyro sensor) 15 detects a camera-shake angle, namely an angle of camera module 100 itself, as an angle of movable body 12 and, furthermore, angles of first capturing module 14a and second capturing module 14b, and outputs the detected angles to the control part. When positional displacement detection part 16b is provided, in the control part, the flowing current of coil part 112 is controlled via driver IC 60 so as to obtain an output (hole output value) from a hole element that is positional displacement detection part 16b, the output corresponding to the detected angle, and movable body 12 is made movable (tilted) to correct shake.

In lens driving device 1, coil part 112 and magnet part 122 that constitute the magnetic circuit part of the OIS voice coil motor are disposed in positions to surround the plurality of capturing modules (first capturing module 14a and second capturing module 14b) that are objects to be moved. Specifically, the magnetic circuit part having magnet part 122 (permanent magnets 122A to 122D) and coil part 112 (tilt coils 112A to 112D) are disposed on base plate 111 on the outer peripheral side in the XY-directions with respect to the lower end of capturing module 14 and stepped surface part 121b of yoke 121. Further, magnet parts 122 are disposed bisymmetrically with respect to the center of gravity of movable body 12 mounted in yoke 121, here, the same position as the center of the Z-axis.

The magnetic circuit part is disposed in a position where a part of the magnetic circuit part overlaps the lower end of capturing module 14 and stepped surface part 121b of yoke 121 in the XY-directions. That is, one of magnet part 122 and coil part 112 (here, magnet part 122) is disposed in a position where the disposed part overlaps in the XY-directions.

In the magnetic circuit part, permanent magnets 122A to 122D constituting magnet part 122 are disposed above tilt coils 112A to 112D constituting coil part 112 and in the state of being partially inserted inside tilt coils 112A to 112D. As a result, permanent magnets 122A to 122D are disposed above tilt coils 112A to 112D respectively corresponding thereto, along the winding directions (Z-direction) of respective tilt coils 112A to 112D. Further, each of magnet part 122 and coil part 112 is disposed in a position where a part of the magnetic circuit part overlaps peripheral side in the lower end of capturing module 14 and stepped surface part 121b of yoke 121 on the outer peripheral side in the XY-directions.

In the OIS voice coil motor having magnet part 122 and coil part 112 disposed as thus described, in an initial state where a current is not flowing through coil part 112, the capturing module 14 (movable body 12) is held in a neutral position where the optical axis coincides with the Z-direction. Here, when capturing module 14 (movable body 12) is offset from the neutral position due to gravity sagging or the like at the time of attaching movable body 12 to fixing body 11, the offset position detected by positional displacement detection part 16 is corrected to be set in the neutral position where the optical axis coincides with the Z-direction.

That is, when a current flows through coil part 112, a Lorentz force is generated at coil part 112 due to interaction between the magnetic field of magnet part 122 and the current flowing through coil part 112 (Fleming's left hand rule). Since coil part 112 is fixed, a reactive force acts on magnet part 122 that is movable body 12. This reactive force is the driving force of the OIS voice coil motor.

Specifically, when mutually reversed currents are allowed to flow through tilt coils 112A, 112C facing each other in the X-axis direction, mutually reversed forces act on permanent magnets 122A, 122C in the Z-direction. Hence movable body 12 including capturing module 14 swings and rotates about the Y-axis with central part 13a of elastic support part 13 taken as a supporting point. Similarly, when mutually reversed currents are allowed to flow through tilt coils 112B, 112D facing each other in the Y-axis direction, movable body 12 including capturing module 14 swings and rotates about the X-axis with central part 13a of elastic support part 13 taken as a supporting point. Movable body 12 swings and rotates until the driving force of the OIS voice coil motor (a force that acts on magnet part 122) and a restoration force of elastic support part 13 become equivalent to each other.

At this time, the flowing current of coil part 112 is controlled based on the detection result of shake detection part 15 such that the shake of capturing module 14 is offset by the swinging and rotation of movable body 12. As a result, shift of the optical axis due to camera shake is corrected, and the optical-axis direction is kept constant.

Since the swinging rotation of movable body 12 is regulated by regulation part 114d of skirt member 114, it is possible to prevent movable body 12 from excessively swinging and rotating due to a falling impact or the like.

The bottom surface of capturing module 14 is fixed to the upper surface of stepped surface part 121b of movable body 12 (a part of the upper surface of yoke 121) with a double-sided tape or a resin-made adhesive bond. On the outer peripheral side of stepped surface part 121b, yoke body 121a of yoke 121 is connected to a position separated from base plate 111 in the Z-direction more than stepped surface part 121b, namely a position higher than stepped surface part 121b, via the inner hanging part of yoke 121. Magnet part 122 is fixed to the lower surface of yoke body 121a, and coil part 112 is disposed so as to be separated from magnet part 122 in the Z-direction with magnet part 122 being within coil part 112. As thus described, the magnetic circuit part having magnet part 122 and coil part 112 is disposed on the outer peripheral side (outer side in the XY-directions) of stepped surface part 121b, namely, the outer peripheral side of capturing module 14. Here, magnet part 122 and coil part 112 are located outside the movable region of capturing module 14.

In yoke 121, magnet part 122 is fixed on the lower surface of yoke body 121a disposed at a higher position of the height level than stepped surface part 121b. That is, magnet part 122 is located at a position closer to outer peripheral side than stepped surface part 121b, to which capturing module 14 is fixed, and higher than stepped surface part 121b.

As thus described, the magnetic circuit part having magnet part 122 (permanent magnets 122A to 122D) and coil part 112 (tilt coils 112A to 112D) are disposed on base plate 111 at the lower end of capturing module 14 or on the outer peripheral side in the XY-directions of stepped surface part 121b of yoke 121. In other words, the magnetic circuit part is not disposed between base plate 111 and capturing module 14 where the height (Z-direction) is limited.

Further, in movable body 12, yoke 121 has a recessed part formed of yoke body 121a (specifically the inner hanging part), stepped surface part 121b, and second stepped surface part 121c in the central portion, and capturing module 14 is fixed into the recessed part.

By the driving force of the voice coil motor having magnet part 122 and coil part 112 as thus disposed, lens driving device 1 tilts a plurality of (first and second) capturing modules 14a, 14b that are the driven part to correct shake.

Further, according to the present embodiment, lens driving device 1 has fixing body 11, movable body 12, and the support part (elastic support part 13). Fixing body 11 has base plate 111 and is provided with either coil part 112 or magnet part 122 on the base member (base plate 111, coil substrate 113) on the outer peripheral side of the driven part (14a, 14b). Movable body 12 has a frame-shaped holding member (yoke 121) that is provided with and holds the other of coil part 112 and magnet part 122 on a surface on the side of the base member on the outer peripheral side of the driven part (14a, 14b). The support part (elastic support part 13) is disposed on the base member and tiltably supports movable body 12 with respect to fixing body 11. The driven part (14a, 14b) are first capturing module 14a and second capturing module 14b each having the lens part and the capturing device. The holding member (yoke 121) has mounting surface part 121b, on which first capturing module 14a and second capturing module 14b are arranged and mounted on the opposite-side surface from the base member and farther inward than the provided location of either coil part 112 or magnet part 122. Yoke (holding member) 121 has a step that makes placed locations (mounting surface part 121b) of the plurality of capturing modules 14a, 14b closer to the base member than the provided location (yoke body 121a) of either coil part 112 or magnet part 122.

According to this lens driving device 1, the plurality of capturing modules (here, first capturing module 14a and second capturing module 14b each having the AF function) can be mounted on yoke 121 both at once and driven by one OIS actuator. As a result, also as the dual camera mounted with first capturing module 14a and second capturing module 14b, camera-shake correction can be performed by one OIS actuator, thereby eliminating the need for using the OIS actuator corresponding to each of first capturing module 14a and second capturing module 14b. It is thus possible to make the dual camera itself compact.

Lens driving device 1 has frame-shaped skirt member 114 that is fixed to base plate 111 and the peripheral edge of base plate 111. Movable body 12 is laid across base plate 111 and skirt member 114. According to lens driving device 1, the number of parts further decreases as compared to the conventional configuration, thereby facilitating the assembly process while enabling further reduction in profile. Just by bonding capturing module 14 with the autofocus function to yoke 121, camera module 100 can be completed in a simple manner.

In the case of performing OIS camera-shake correction, lens driving device 1 performs the correction by adjusting the posture of yoke 121 itself, namely an angle. Therefore, when lens driving device 1 performs camera-shake correction, it is possible to simultaneously correct the angles of the plurality of capturing modules 14a, 14b. That is, even when focal distances of the plurality of capturing modules 14a, 14b are different from each other, the capturing modules 14a, 14b can be corrected with the same correction quantity in the compact configuration. As thus described, even when capturing modules 14a, 14b are provided with the AF function, it is possible to achieve a compact lens driving device capable of performing favorable camera-shake correction without a camera-shake correction error between capturing modules 14a, 14b.

According to lens driving device 1, the placed locations of the plurality of capturing modules 14a, 14b in yoke 121 can be made lower than the provided locations of coil part 112 and magnet part 122, to more reliably realize further reduction in profile. At the same time, the height of magnetic circuit part, namely the length of coil part 112 or magnet part 122 is not limited, thereby not causing a deterioration in magnetic efficiency or an increase in power consumption accompanied by the deterioration. That is, it is possible to ensure a height space required to constitute the magnetic circuit part by using the outer peripheral space of the plurality of capturing modules 14a, 14b, whereby the configuration of the magnetic circuit part itself can be increased in height direction. For example, the height (Z-direction) of coil part 112 (tilt coils 112A to 112D) can be made larger by increasing the number of windings thereof, or the length of magnet part 122 (permanent magnets 122A to 122D) in the Z-direction can be made larger. This can further increase a magnetic force, thereby increasing the magnetic efficiency and lower the power consumption.

Coil part 112 (tilt coils 112A to 112D) is provided with a winding shaft of the coil of coil part 112 (tilt coils 112A to 112D) oriented in the direction in which base plate 111 and holding member (yoke) 121 face each other. Magnet part 122 (permanent magnets 122A to 122D) is provided so as to project in the central part of coil part 112 (tilt coils 112A to 112D). Hence coil part 112 and magnet part 122 can be increased in the height direction (Z-direction) without being increased in the outer peripheral side (XY-directions). As a result, the configuration of the magnetic circuit part itself can be increased without increasing the space for disposing the magnetic circuit part itself in lens driving device 1.

When the hole element is provided as positional displacement detection part 16b, a leakage flux between magnet part 122 and coil part 112 is detected, so that the moving quantities of capturing module 14 in the X-axis direction and the Y-axis direction can be directly detected via tilting of yoke 121. It is thereby possible to detect an offset due to an empty weight (gravity sagging) of the plurality of capturing modules 14a, 14b during non-driving time, or it is possible to detect an offset due to a reactive force of flexible printed circuits (FPCs) in the plurality of capturing modules 14a, 14b at the time when movable body 12 is fixed to fixing body 11. Accordingly, the offset positions of the plurality of capturing modules 14a, 14b are detected and corrected by using positional displacement detection part 16, whereby camera module 100 can position the plurality of capturing modules 14a, 14b without tilting at the time of activation. In other words, when the control part (not illustrated) is provided with positional displacement detection part 16b at the time of correcting the shake (angle shake) of camera module 100 itself, the shake corresponding to the detection signal of shake detection part 15, the control part can perform control (so-called feedback control) on the flowing current of coil part 112 based on the detection signal such that movable body 12 and capturing module 14 return to reference positions.

In the present embodiment, elastic support part (support part) 13 tiltably supports movable body 12 with respect to fixing body 11 by elastic deformation. Frame-shaped holding member (yoke) 121 has stepped surface part (mounting surface part) 121b on which capturing modules 14a, 14b are mounted, and second stepped surface part (gimbal fixing part) 121c, to which elastic support part 13 is attached on the stepped surface part lower than stepped surface part 121b, second stepped surface part being disposed inside stepped surface part 121b.

Specifically, second stepped surface part 121c of yoke 121 is formed one level lower than stepped surface part 121b, and a separation distance between each of capturing modules 14a, 14b and elastic support part 13 is larger by the step formed one level lower. That is, the bottom surfaces of capturing modules 14a, 14b are located in positions separated in advance from elastic support part 13 being the gimbal. As a result, as compared to the case where capturing modules 14a, 14b are fixed to stepped surface part 121b, even when movable body 12 moves and swings so as to be twisted about the X-axis, capturing modules 14a, 14b does not come into contact with the gimbal spring as elastic support part 13. It is thus possible to increase the movable range of movable body 12 as compared to a camera module with a configuration where capturing module 14 is fixed to second stepped surface part (gimbal fixing part) 121c.

Further, in the embodiment, two pairs being a pair of tilt coil 112A and permanent magnets 122A and a pair of tilt coil 112C and permanent magnets 122C are disposed as the voice coil motor that swings and rotates movable body 12 about the Y-axis, and two pairs being a pair of tilt coil 112B and magnet coil 122B and a pair of tilt coil 112D and permanent coil 122D are disposed as the voice coil motor that swings and rotates movable body 12 about the X-axis, but in each of the above two pairs, at least one pair may only be disposed.

To shake detection part 15, it is possible to apply a photo reflector, a magnetic sensor, inductance detection by a coil, distortion sensor, or the like other than the gyro sensor. When the detection element (for example, a photodetector of a photo reflector, a hole element of a magnetic sensor, or the like) is disposed in the movable body, a detection signal is preferably output via the printed circuit board of the capturing module.

Each part constituting lens driving device 1 is preferably formed of a material with high heat resistance (especially magnet part 122). It is thereby possible to deal with soldering performed by a reflow method. In addition, for noise reduction, a conductive shield case may be provided outside camera module 100.

Figure 10A:
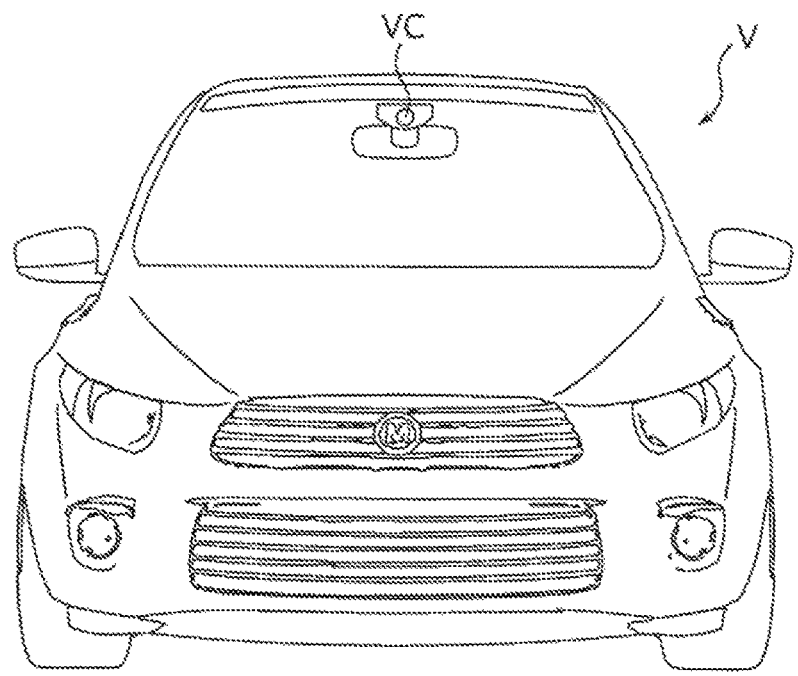
FIG. 10A is a front view illustrating an automobile mounted with an on-board camera according to one embodiment of the present invention.
Figure 10B:
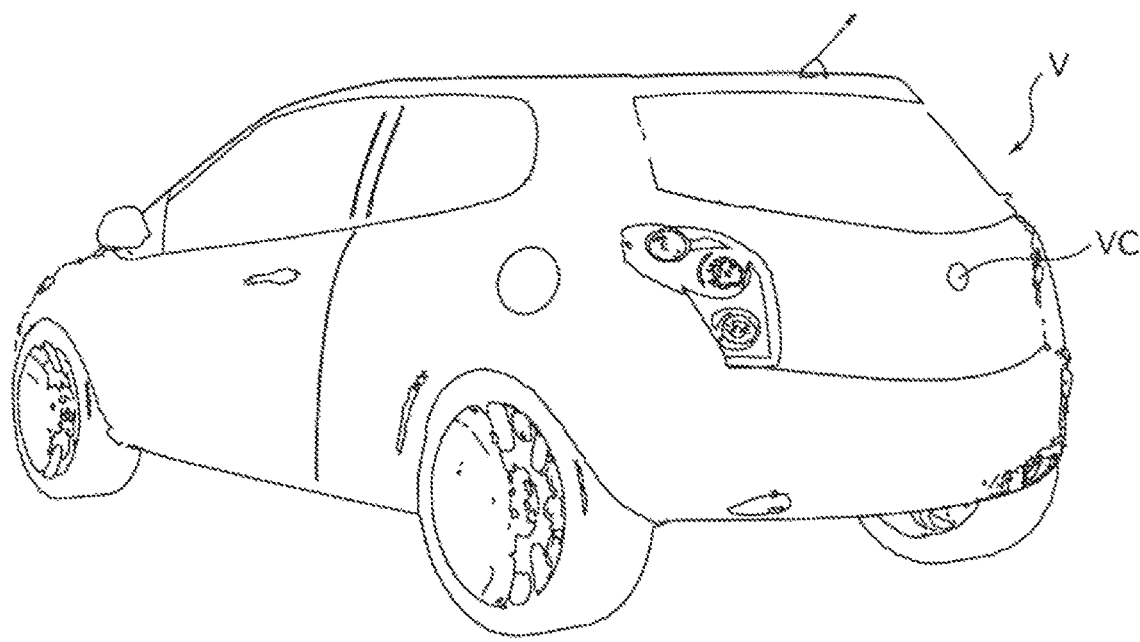
FIG. 10B is a perspective view illustrating the automobile mounted with the on-board camera.

In the embodiment, the description has been given taking the smartphone that is a mobile terminal with a camera as the example of the camera-mounted device provided with camera module 100, and the present invention can also be applied as a camera-mounted device that is an information device or a transporting device. For example, the present invention is also applicable, as the camera-mounted device, to a mobile phone with a camera, a laptop computer, a tablet terminal, mobile game machine, a web camera, and the like. Further, the present invention is also applicable, as the camera-mounted device, to an automobile, an on-vehicle device with a camera (for example, a rear-monitor device, a drive recorder device), and the like. FIGS. 10A and 10B illustrate automobile V mounted with an on-board camera module (vehicle camera). FIG. 10A is a front view of automobile V, and FIG. 10B is a rear perspective view of automobile V. Automobile V is mounted with camera module 100 described in the embodiment as on-board camera module VC. This on-board camera module VC is used for back monitoring, drive recording, collision avoidance control, automatic drive control, and the like.

The embodiment disclosed this time should be considered as illustrative in all aspects rather than restrictive. The scope of the invention is represented by the claims rather than the above description, and is intended to include meanings equivalent to the claims and all changes within the claims.

The entire contents of disclosure of the specification, drawings, and abstracts included in Japanese Patent Application No. 2016-150294 filed Jul. 29, 2016 are incorporated herein by reference in their entirety.

INDUSTRIAL APPLICABILITY

An actuator, a camera module, and a camera-mounted device according to the present invention can be reduced in size and cost and has the effect of achieving a dual camera without an error of camera-shake correction, and is useful as an device applicable to an information device including a mobile terminal such as a smartphone, a transporting device such as an automobile, an on-vehicle device with a camera, and the like.

REFERENCE SIGNS LIST

1 Lens driving device (actuator)
11 Fixed body
12 Movable body
13 Elastic support part (support part)
13a Central part
13b Gimbal part
13c Y-axis connection part
13d X-axis connection part
14 Capturing module (driven part)
14a First capturing module (driven part)
14b Second capturing module (driven part)
15 Shake detection part
60 Driver IC
100 Camera module
111 Base plate
111a Projection
112 Coil part
112A, 112B, 112C, 112D Tilt coil
113 Coil substrate
114 Skirt member (cover member)
114a Reception port
114b Wall body
114d Regulation part
115 Upper cover member
115a Opening
121 Yoke (holding member)
121a Yoke body (holding part body)
121b Stepped surface part (mounting surface part)
121c Second stepped surface part
121d Outer hanging part
122 Magnet part
122A, 122B, 122C, 122D Permanent magnet
123a, 123b Module guide
141 Body
143 Capturing-module printed wiring board

The invention claimed is:

1. An actuator that tilts a driven part for shake correction by using a driving force of a voice coil motor including a coil part and a magnet part, the actuator comprising:
a fixing body that includes a base member and is provided with one of the coil part or the magnet part on the base member on an outer peripheral side of the driven part;
a movable body that includes a frame-shaped holding member that is provided with and holds the other of the coil part or the magnet part on a surface on a side of the base member surface on an outer peripheral side of the driven part; and
a support part that is disposed on the base member and tiltably supports the movable body with respect to the fixing body, wherein
the driven part is a first capturing module and a second capturing module each including a lens part and a capturing device, and
the holding member includes a mounting surface part on which the first capturing module and the second capturing module are mounted on a surface on a side opposite from the base member and more inside than a provided location of one of the coil part or the magnet part.

2. The actuator according to claim 1, wherein the holding member includes a step that makes the mounting surface part closer to the base member than the provided location of one of the coil part or the magnet part is.

3. The actuator according to claim 1, wherein the holding member is a yoke made of a magnetic material.

4. The actuator according to claim 1, wherein the magnet part is disposed in the holding member and the coil part is disposed on the base member.

5. The actuator according to claim 1, wherein
the mounting surface part is provided in a flat frame shape to which bottom surfaces of the first capturing module and the second capturing module are firmly fixed,
the holding member is provided on an outer peripheral side from an outer edge of the frame-shaped mounting surface part and is formed in a recessed shape opened to a side of the base member, and a bottom surface of this recessed shape includes a holding part body located at a position separated more from the base member than the mounting surface part, and
the holding body fixes and holds, on the bottom surface, one of the coil part or the magnet part.

6. The actuator according to claim 1, wherein
the support part is made of an elastic support part having a two-axis gimbal mechanism with two rotary shafts orthogonal to each other,
the elastic support member is disposed in an opening inside the holding member such that the two rotary shafts are orthogonal to directions of optical axes of the first and the second capturing modules, the elastic support member being fixed to the holding member by a connection part extending along one of the shafts from a gimbal portion, the elastic support member being fixed to the base member in a central portion connected by a connection part extending along the other shaft from the gimbal portion, and
the first capturing module and the second capturing module are disposed in proximity from the central portion at an equal interval.

7. The actuator according to claim 6, wherein the coil part and the magnet part are disposed on the outer peripheral side of the elastic support member.

8. The actuator according to claim 1, wherein
the fixing body further includes a frame-shaped cover member fixed to a peripheral edge of the base member, and
the movable body is placed to be held between the base member and the cover member.

9. The actuator according to claim 1, wherein
the coil part is provided with a winding shaft of a coil of the coil part oriented in a direction in which the base member and the holding member face each other, and the magnet part is provided to project in a central part of the coil part.

10. A camera module, comprising:
the actuator according to claim 1;
the first capturing module and the second capturing module bonded to the holding member as the driven part; and
a shake detection part that detects shake of the capturing module.

11. The camera module according to claim 10, wherein at least one of the first capturing module or the second capturing module has an autofocus function.

12. A camera-mounted device that is an information device or a transporting device, the device comprising the camera module according to claim 10.

* * * * *